United States Patent [19]

Ueno et al.

[11] Patent Number: 4,568,990
[45] Date of Patent: Feb. 4, 1986

[54] CASSETTE LOADING DEVICE FOR CASSETTE TAPE RECORDER

[75] Inventors: Hideto Ueno; Teruo Hatsuda, both of Katsuta, Japan

[73] Assignee: Hitachi, Ltd., Tokyo, Japan

[21] Appl. No.: 442,420

[22] Filed: Nov. 17, 1982

[30] Foreign Application Priority Data

Nov. 20, 1981 [JP] Japan .................. 56-185372

[51] Int. Cl.[4] ............... G11B 15/18; G11B 17/00
[52] U.S. Cl. .................... 360/96.5; 360/71; 360/105
[58] Field of Search .............. 360/93, 90, 96.1, 96.5, 360/96.6, 105, 71; 242/197-200

[56] References Cited

U.S. PATENT DOCUMENTS

| | | | |
|---|---|---|---|
| 4,308,562 | 12/1981 | Negishi | 360/93 |
| 4,319,292 | 3/1982 | Katoh | 360/96.5 |
| 4,337,487 | 6/1982 | Takai | 360/96.5 |
| 4,403,265 | 9/1983 | Okada et al. | 360/150 |
| 4,450,492 | 5/1984 | Okada et al. | 360/96.5 |

*Primary Examiner*—Stuart N. Hecker
*Assistant Examiner*—David J. Severin
*Attorney, Agent, or Firm*—Antonelli, Terry & Wands

[57] ABSTRACT

A power assist cassette loading device for pulling and loading a cassette automatically into a tape recorder. The device has a drive gear member adapted to be driven by a motor, a power assist member adapted to be driven by the drive gear member so as to sequentially effect the pulling of the cassette, loading of the cassette and advancing of a head plate overcoming respective biasing forces, and a power assist retainer member for retaining the power assist operation member. The power assist operation member is driven in the earlier half part of rotation of the drive gear member and is then retained by the retaining member. Then, in the later half part of the rotation of the drive gear member, the power assist operation member is released and made to sequentially effect the pulling of the cassette, loading of the cassette and the advancing of the head plate. Finally, the power assist operation member is retained again by the retainer member.

8 Claims, 13 Drawing Figures

CASSETTE LOADING DEVICE FOR CASSETTE TAPE RECORDER

BACKGROUND OF THE INVENTION

The present invention relates to a cassette loading device for 9 cassette tape recorder and, more particularly, to a cassette loading device which can automatically pull and load the cassette by a power assist.

Such cassette loading device have been known which are adapted to automatically pull and load a cassette by sequentially performing the pulling and loading of a cassette and advancing of the head plate overcoming respective biasing forces by the operation of a power assist operation member which, in turn, is actuated by a driving gear connected to a motor. In one of these known devices, two operation levers are actuated in a staggered manner, i.e. at different times, by two actuator pins mounted on a drive gear. In another known device, two operation levers are actuated reciprocatingly back and forth by a single drive pin in each rotation of the drive gear to thereby pull the cassette into the tape recorder and the advance the head plate.

In the cassette loading device of the first-mentioned type, the number of parts is increased and the constructuion is complicated impractically, and the operation is often made unstable due to the difficulty in obtaining optimizing the timings of operation of two operation levers. The cassette loading device of the second-mentioned type also suffers from a disadvantage that, since the automatic pulling and loading of the cassette is made by actuating the operation levers in two directions for each half rotation of the driving gear, the construction is complicated and the space for installing the device is increased because two operation levers are arranged on the upper surface of the drive gear.

SUMMARY OF THE INVENTION

Accordingly, an object of the invention is to provide a cassette loading device of tape recorder for performing automatic pulling and loading of a cassette by power assist, offering a simple construction and stable operation, to thereby overcome the above-described problems of the prior art.

Another object of the invention is to provide a small-sized cassette loading device of power assist type, having reduced number of parts and occupying small installation space.

Still another object of the invention is to provide a cassette loading device in which a power assist operation member can operate with a sufficiently large stroke by one rotation of a drive gear.

To this end, according to the invention, there is provided a power assist cassette loading device in which a power assist operation member is driven by an earlier half part of rotation of a drive gear and is retained by a retaining member and, thereafter, the power assist operation member is released in the later half part of the drive gear to effect the pulling of the cassette, loading of the cassette and the advancing of the head plate in sequence overcoming respective biasing forces and, finally, the power assist operation member is retained again by the retaining member at the end of the later half part of rotation of the drive gear member.

These and other objects, features and advantages of the invention will become clear from the following description of the preferred embodiments taken in conjunction with the accompanying drawings.

DETAILED DESCRIPTION OF THE PREFERRED EMBODIMENT

Figure 1:
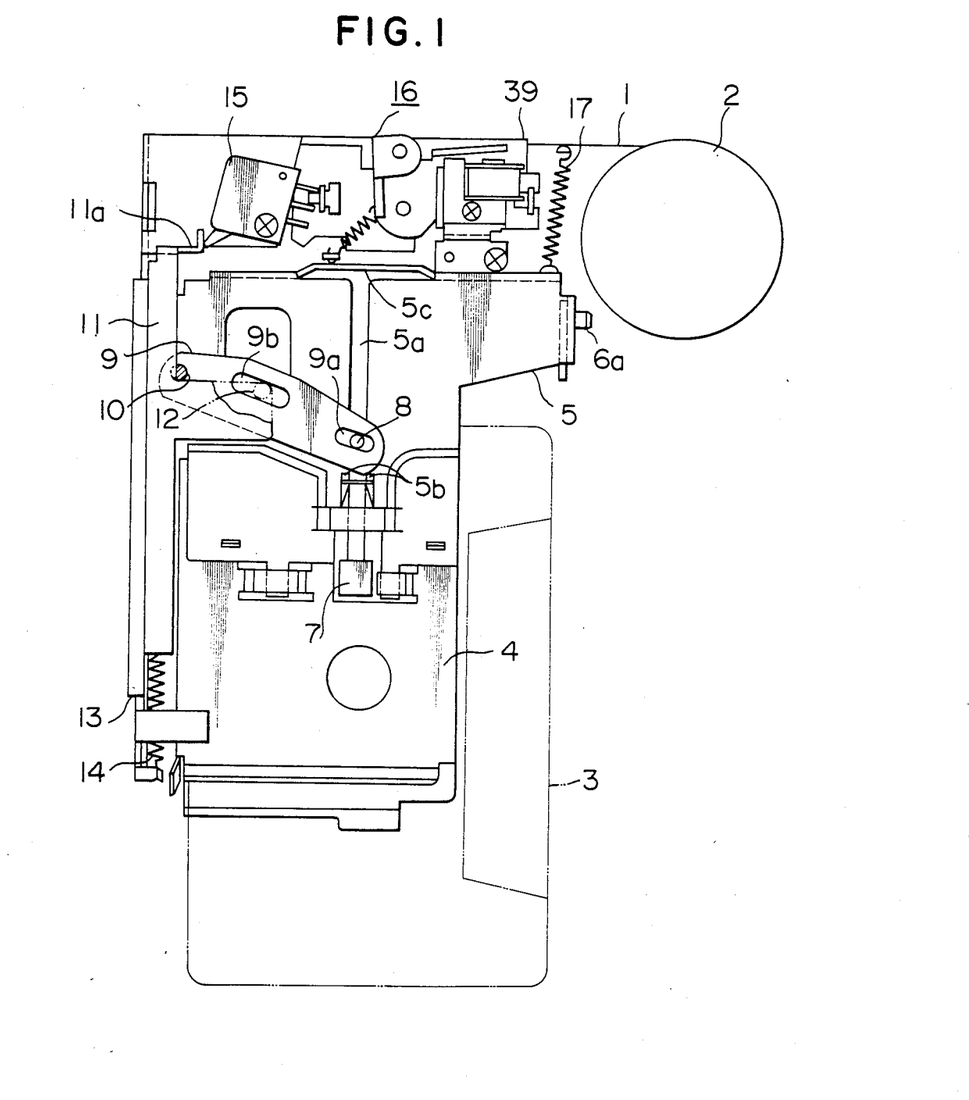
FIG. 1 is a schematic plan view of a cassette loading device in accordance with an embodiment of the invention.
Figure 2:
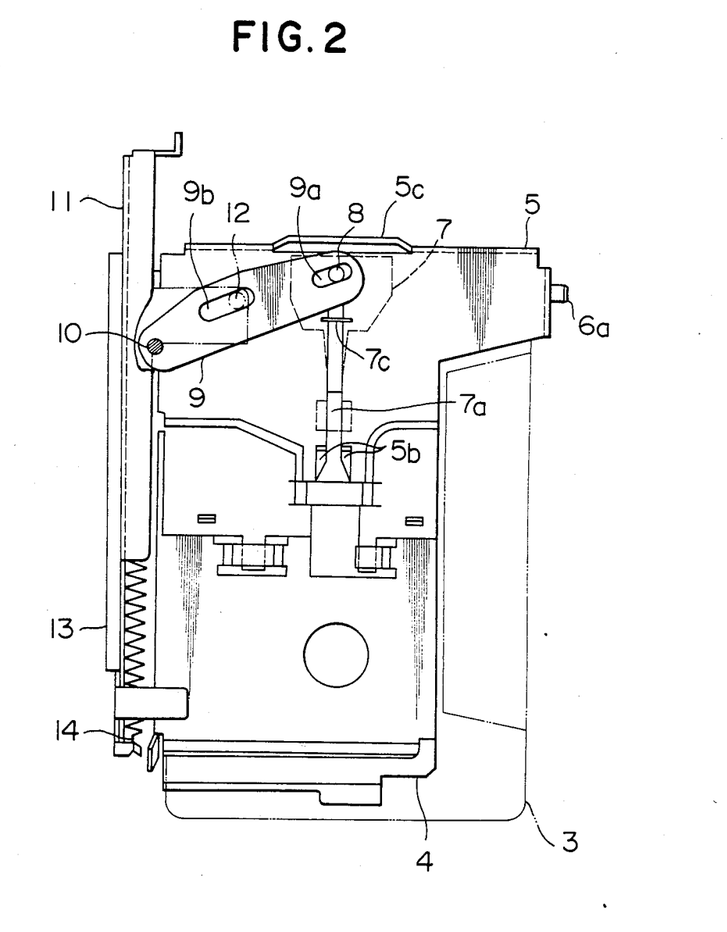
FIG. 2 is a plan view of the embodiment shown in FIG. 1 in the state in which a cassette is being pulled.

Referring first to FIG. 1 schematically showing an embodiment of the invention, a chassis 1 carries a motor 2 and a rotatable cassette suspending plate member 5 supported by cassette suspending plate shafts 6a, 6b. The cassette suspending plate member 5 suspends a cassette housing member 4 which guides and houses cassette 3, with a tongue-shaped projections on one end thereof received by a groove provided in the cassette housing 4 and has grooves for guiding bent portions of the housing. The cassette suspending plate member 5 is adapted to lift and lower the cassette housing member 4 between a loading position and unloading position. The cassette suspending plate member 5 is provided at its central portion with an elongated groove 5a which is extended in the direction of insertion of the cassette. A cassette engaging member 7, having one end engagable with a reel die hole of a cassette 3, is slidably attached to the elongated groove 5a. The cassette suspending plate number 5 carries a cassette operation lever 9 rotatable around a shaft 10 extending from one end thereof. The cassette driving lever 9 is provided at the other end thereof with an elongated hole 9a receiving a guide pin 8 of the cassette engaging member 7. Another elongated hole 9b is formed in the central portion of the cassette operation lever 9. The elongated hole 9b receives a pin 12 of a first slider 11 forming a power assist operation member. A holder member 13, for supporting the power assist operation member, is fixed to the chassis 1 at one side of the cassette loading mechanism having the construction described hereinbefore. A first slider 11, slidably attached to the holder member 13, is biased by a first reset spring 14 in the cassette ejecting direction. The first slider 11 has a bent end forming a switch operating portion 11a held in mechanical contact with a power supply switch 15 so that the switch 15 is turned on and off by the operating portion 11a.

A power assist retainer member 16 is disposed in a space above the chassis defined between the cassette loading mechanism and the motor. A spring 17 is stretched between the cassette suspending plate member 5 and the chassis 1 so as to bias the cassette suspending plate member in the cassette loading direction.

Figure 3:
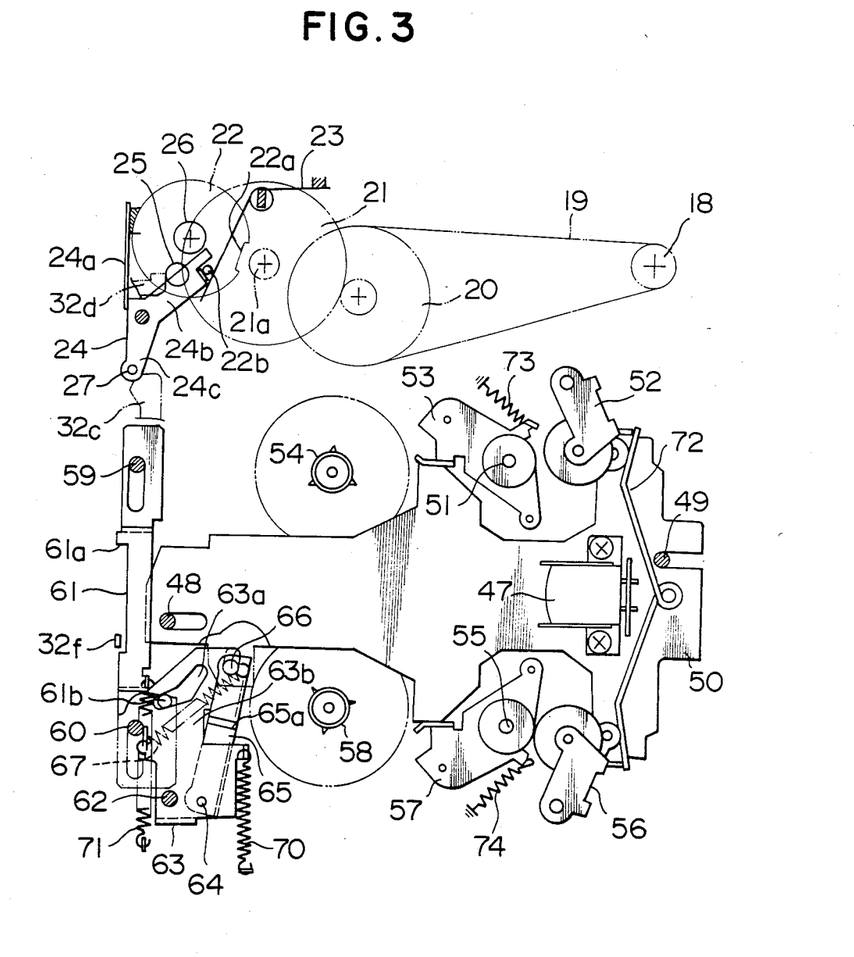
FIG. 3 is a plan view schematically showing a drive gear mechanism and head plate advancing mechanism of the embodiment.
Figure 5A:
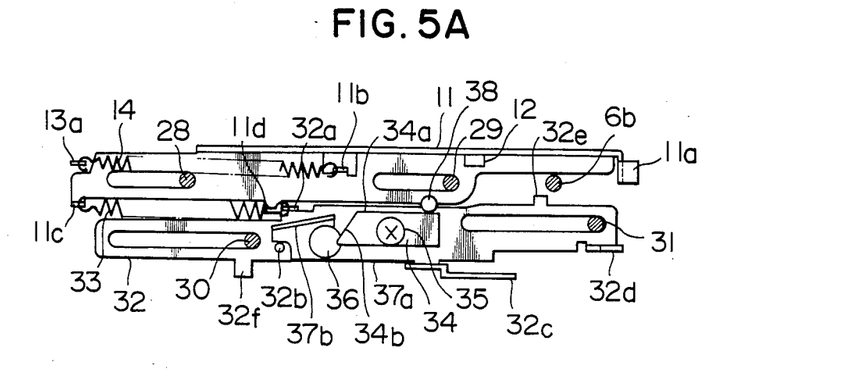
FIGS. 5A, 5B and 5C are side elevational views illustrating the operation of a power assist operation member.

Hereinafter, the outline of the driving mechanism incorporated in the cassette loading device of this embodiment will be explained with specific reference to FIG. 3 which shows the mechanism in the state before the insertion of the cassette. A power transmitting belt 19 runs round a motor pulley 18 secured to the drive shaft of the motor 2 and a pulley gear 20 having a small gear. An intermediate gear 21 meshes with the small gear of the pulley gear 20. The intermediate gear 21 continuously rotates during the operation of the motor 2. A power assist drive gear member 22, having a non-toothed portion 22a, is disposed at a position where it can mesh with the small gear 21a of the intermediate gear 21. The drive gear member 22 is disposed such that an axis thereof extends in parallel to a drive shaft of the cassette tape recorder. The power assist retainer member 16 is disposed in parallel with a plane of rotation of the drive gear member 22 so as to be in opposition thereto. The power assist operation member is adapted to slide along a plane which is parallel to a direction of insertion of the cassette 3 and substantially perpendicular to the plane of rotation of the drive gear member 22. A roller pin 25, which is an engaging pin for the power assist operation member, and a stop pin 22b are formed as a unit with the drive gear member 22 to project from the upper and lower surfaces thereof, respectively. A biasing spring 23 resiliently contacts with the stop pin 22b to thereby bias the drive gear member 22 in the clockwise direction. However, the stop pin 22b is contacted by the arm portion of a stop lever 24 positioned ahead thereof, as viewed in the clockwise direction, so that the drive gear member 22 is held at such a position that the non-toothed portion 22a is disposed in opposition to the small gear 21a of the intermediate gear 21 and the drive gear member 22 does not mesh with the intermediate gear 21. The stop lever 24 is rotatably attached to the chassis 1 and directions. More specifically, the first arm portion 24a of the stop lever 24 has a spring function with its one end resiliently contacting the chassis 1 thereby resiliently biasing the stop lever 24 in the counter-clockwise direction, while the second arm portion 24 is provided at its end with a bent portion which engages the stop pin 22b of the drive gear member 22 and the makes a resilient contact with the shaft 26 of the drive gear member 22 by a counter-clockwise biasing force. The third arm 24c is provided at its end with a pin 27 standing upright therefrom. As shown in FIG. 5A, the power assist operation member is provided with a first slider 11 and a second slider 32 in the form of thin plates produced by press, punching or the like. The first slider 11 and the second slider 32 are arranged in parallel and are slidably secured to the holder member 13. The first slider 11 has two elongated holes engaged by the guide pins 28, 29 provided on the holder member 13, respectively, and are guided by guide pins 28, 29. The first reset spring 14 is stretched between a spring retainer 11b formed on the first slider 11 and a spring retainer 13a on the holder member 13, to thereby bias the first slider 11 in the cassette ejecting direction. Similarly, the second slider 32 is guided also guide pins 30, 31 provided on the holder member 13. The second slider 32 has a spring retainer 32a retaining one end of a second reset spring 33 whose other end is retained by a spring retainer 11c also formed on the first slider 11. Thus, the second reset spring 33 is connected between the first and second sliders 11, 32 so as to attract the sliders 11, 32 toward each other to bring the spring retainer 32a and the engaging portion 11d into contact with each other. The tension of the second reset spring 33 is greater than that of the first reset spring 14 as obtained when the first reset spring 14 is fully stretched by the operation of the first slider 11.

A cam member 34 is attached to the second slider 32 by means of fixing screws 35. The cam member 34 has a flat surface portion 34a and a tapered surface portion 34b for controlling the cassette unloading position and the cassette loading position of the cassette suspending plate member 5. A rotary spring member 37, for pressing and holding the cassette, rotatable around a pin 36, is provided on the second slider 32, at a position adjacent to the tapered surface portion 34b. The rotary spring member 37 has two arms one arm 37a of which exerts a resilient force for biasing the rotary spring member 37 in the counter-clockwise direction. The rotation of the rotary spring member 37 is limited by the projection 32b on the second slider 32. The rotary spring member 37 is provided at its one end with a bent portion 37b which presses the position control pin 38 on the cassette suspending plate member 5.

Furthermore, the second slider 32 is provided with a stop lever operating portion 32c which is adapted to engage with the pin 27 of the stop lever 24 thereby releasing the drive gear 22 from the retained position. The second slider 32 further has a first engaging portion 32d formed at the end portion of the second slider 32 and adapted to be engaged by a roller pin 25 on the drive gear member 22, a second engaging portion 32e on one side of the second slider 32 adjacent to the first slider, and a third engaging portion 32f for actuating the head plate advancing mechanism.

Figure 6A:
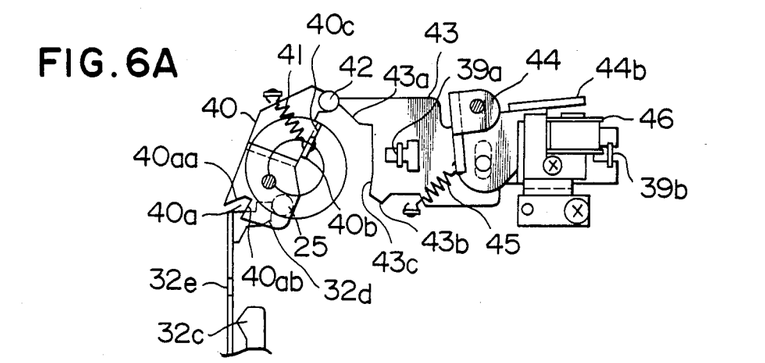
FIG. 6A, 6B and 6C are plan views showing the operation of a power assist retaining mechanism incorporated in the embodiment of the invention.

As shown in FIG. 6A, depicting power assist retainer member in the state before the insertion of the cassette, has a retainer lever 40, retainer slider 43, a rotary lever 44 and a solenoid 46 are disposed on a mounting plate 39 secured to the chassis 1. The retainer lever 40 is rotatably supported by a shaft and is provided in its one end with an engaging groove 40a having a first engaging surface 40aa and a second engaging surface 40ab for engaging with the second engaging portion 32e of the second slider 32. A rock pin 42 is rotatably provided on the other end of the retainer lever 40. The retainer lever 40 is biased in the counter-clockwise direction by a spring 41 which is stretched between its spring retainer 40b and the mounting plate 39. The retainer lever 40, disposed in opposition to the drive gear member 22, is provided with an engaging bent portion 40c at a position corresponding to the locus drawn by the roller pin 25 when the drive gear 22 rotates and, hence, engaged by the roller pin 25 in the later half part of rotation of the drive gear member 22.

The retainer slider 43, disposed adjacent to the retainer lever 40, is provided at its end adjacent to the retainer lever with a tapered surface, first engaging portion 43a, unlocking tapered surface 43c and a second retainer portion 43b which are adapted to sequentially make contact with the lock pin 42 on the retainer lever. This retainer slider 43 is adapted to slide, while being guided by guides 39a, 39b, on the mounting plate 39. The sliding motion of the retainer slider 43 and the rotation of the rotary lever 44, rotatably supported on the mounting plate 39 by a shaft, are interlocked with each other by an engagement between a pin on the rotary lever 44 and an alongated hole formed in the retainer slider. Since the rotary lever 44 is biased clockwise by a spring 45 stretched between itself and the mounting plate 39, the retainer slider 43, connected by the pin to the rotary lever 44, is slidingly biased towards the retainer lever 40. A solenoid 46 is disposed to oppose to an arm 44b of a magnetic member so as to selectively attract the arm 44b to thereby lock the rotary lever 44.

Figure 7A:
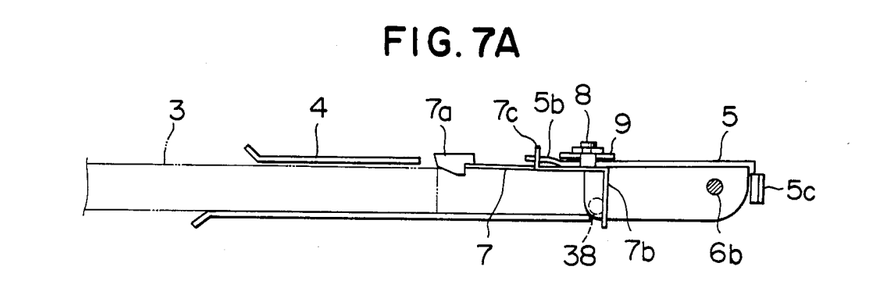
FIGS. 7A, 7B and 7C are sectional side elevational views for explaining the operation of the cassette loading device embodying the present invention.

As shown in FIG. 7A, wherein mechanism in the state in which a cassette is being inserted. The cassette suspending plate member 5, rotatably secured to the chassis 1 by the shafts 6a, 6b, is adapted to suspend the cassette housing 4 which is a frame-like member adapted for guiding and housing the cassette. The cassette suspending plate member 5 has a cassette 7c guides the sliding movement of the cassette engaging member 7 slidable along the elongated groove 5a formed therein. The cassette engaging member is provided at its one end with a cassette engaging portion 7a of a shape suitable for engagement with the reel die hole of the cassette, while the other end is bent to provide an engaging bent portion 7b which confronts the cassette entrance surface of the cassette housing 4. The guide pin 8 engageable with the elongated groove 5a of the suspending plate member 5 and a bent guide portion 7c are provided on the upper surface of the central portion of the cassette engaging member 7. The bent guide portion 7c guides the sliding movement of the cassette engaging member 7. When the cassette loading mechanism is in the cassette ejecting state, the bent guide portion 7c rides on the guide stepped portion 5b of the cassette suspending plate member 5 to thereby lift the cassette engaging portion 7a in the clockwise direction so as to disengage the latter from the reel die hole. The cassette suspending plate member 5 is provided with a position control pin 38 which engages with a cam member 34 on the second slider to thereby control the position of the suspending plate member 5. As shown in FIG. 3 at the lower side of the cassette housing 4, a head plate 50 is disposed carrying a magnetic head 47, with the head plate 50 being guided by the guide pins 48, 49 on the chassis 1. A forward capstan 51, pinch roller member 52, take-up arm member 53, biased counterclockwise by a spring 73, reel die 54, reverse capstan 55, pinch roller member 56, take-up arm member 57, and a reel die 58 are disposed around the forward capstan 51. As the head plate 50 is advanced, the biasing spring 72, provided on the head plate 50 urges the pinch rollers 52, 56 toward the capstans 51, 55, while releasing the take-up arm members 53, 57, urged by the springs 73, 74, to thereby rotate take-up arm members 53, 57 toward the capstans 51,55. A power assist connection slider 61 is disposed below the power assist operation member in the direction perpendicular to the direction of sliding of the head plate 50. The power assist connection slider 61 is biased by a spring 71 in the direction of retraction of the head plate while being guided by guide pins 59, 60 on the chassis 1. The slider 61 has a notch or groove for receiving a third engaging portion 32f of the second slider 32 which is disposed at a position above and adjacent to the slider 61. The groove in the slider 61 is provided at its one end with a first engaging portion 61a the position of which is so selected that it is engaged by the third engaging portion 32f of the second slider 32 to thereby drive the slider 61 after the completion of pulling and loading of the cassette.

The power assist connection slider 61 is provided with an engaging pin 61b which constitutes a second engaging portion. The engaging pin 61b engages with the elongated groove 63a formed in the other end of the head plate operation member 63 rotatably supported at its one end by the shaft 62 on the chassis 1. The elongated groove 63a has a cam portion. A rotary lever 65 rotatably around a pin 64 is secured to the head plate operation plate 63 at the portion adjacent to the shaft 62. An engaging pin 66 provided on the other end of the rotary lever 65 engages with the elongated hole 50a in the head plate 50. A spring 67 is stretched between the head plate operation member 63 and the rotary lever 65 so as to make them resiliently contact each other at their opposing ends 63b, 65a. The spring 70 connected to the head plate operation member 63 bias the latter in the head retracting direction. The sliding motion of the head plate 50 and the sliding motion of the power assist connection slider 61 do not perfectly coincide with each other due to the necessity for imparting a position holding force to the head plate 50 in the advanced position. Namely, the power assist connection slider 61 is further moved ahead slightly so as to strecth the spring 67 even after the head plate 50 is stopped by the guide pin 48, thereby to make the head plate 50 hold the advanced position.

The cassette loading device of the invention having the described construction operates in the following manner.

First of all, the cassette 3 is inserted into the cassette housing 4 as shown in FIGS. 1 and 7A. The inserted cassette 3 abuts the engaging bent portion 7b of the cassette engaging member 7 to thereby make the cassette engaging member 7 slide on the cassette suspending plate member 5. As a result of this sliding motion, the bent guide portion 7c of the cassette engaging member 7 is disengaged from the stepped guide portion 5b of the suspending plate member 5, so that the cassette engaging portion correctly comes into the reel die hole of the cassette 3 so that the cassette is retained.

Meanwhile, the cassette operation lever 9 is rotated following the sliding movement of the cassette engaging member 7, so that the first slider 11 starts to slide.

The sliding movement of the first slider 11 makes the switch operating portion 11a turn the power switch 15 on to thereby start the motor 2. On the other hand, the engaging portion 11d presses the spring retainer 32a of the second slider 32 thereby sliding the latter. Consequently, the first engaging portion 32d of the second slider 32 approaches the roller pin 25 of the drive gear member 22 to intersect the locus of rotation of the roller 25, while the stop lever actuating portion 32c urges the pin 27 of the stop lever 24 in the clockwise direction overcoming the counterclockwise biasing force, to thereby release the driving gear member 22 from the locking against rotation. The released drive gear member 22, now freely rotatable, is rotated by the biasing force of the spring 23 to bring its toothed portion into engagement with the small gear 21a so as to be driven by the motor 2.

As a result of rotation of the drive gear member 22, the roller pin 25 is brought into engagement with the first engaging portion 32d of the second slider 32 to thereby slidingly drive the second slider 32 over the earlier half part of rotation of the drive gear member 22. This sliding motion of the second slider 32, in turn, causes a sliding movement of the first slider 11 through the second reset spring 33, overcoming the force of the first reset spring 14, so that the cassette engaging member 7 is actuated through the cassette operation lever 9 to thereby pull or retract the cassette.

Figure 5B:
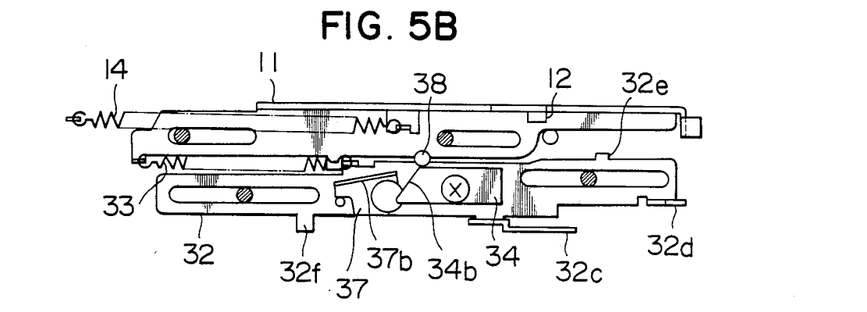
Figure 7B:
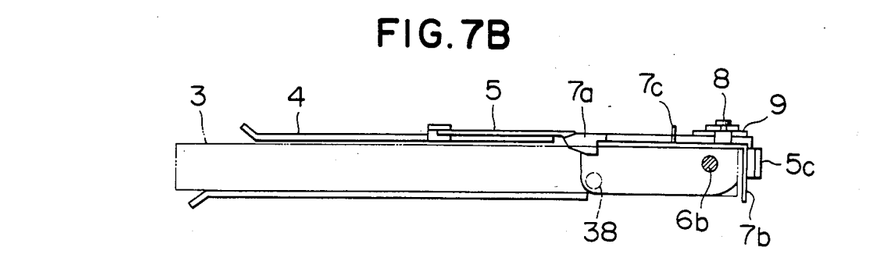

This pulling operation is made until the moving parts take the position shown in FIGS. 5B and 7B, i.e. until the first slider 11 assumes the end of the sliding stroke. As will be seen from FIG. 5B, when the first slider takes this position, the position control pin 38 remains on the terminal end of the flat surface portion 34a of the cam member 34 on the second slider, so that the cassette suspending plate member 5 maintains the horizontal position, i.e. the position for pulling the cassette.

Figure 6B:
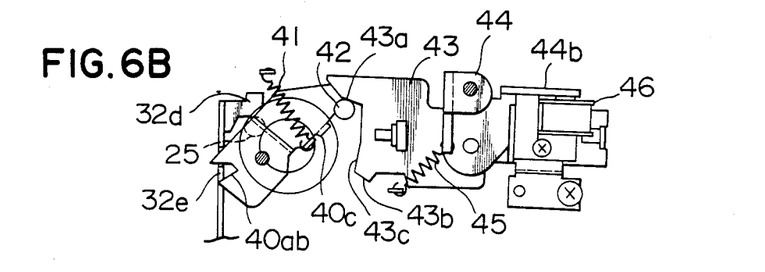

Furthermore, as a result of sliding of the second slider, the second engaging portion 32e thereof contacts the first engaging surface 40aa of the engaging groove 40a of the retainer lever 40 shown in FIG. 6A to thereby rotate the retainer lever 40 overcoming the biasing force, so that the lock pin 42 of the retainer lever 40 rotates along the tapered surface leading to the first retainer portion 43a of the retainer slider 43. Subsequently, as the second slider 32 slides further, the retainer lever 40 is further rotated so that the second engaging portion 32e of the second slider comes into the engaging groove 40a in the retainer lever as shown in FIG. 6B. Then, as the drive gear member 22 is further rotated to the end of the earlier half part of the rotation, i.e. to the position where the roller pin 25 leaves the first engaging portion 32d of the second slider, the lock pin 42 of the retainer lever has been rotated beyond the first retainer portion 43a of the retainer slider 43.

When the motor 2 is started, the solenoid 46 of the power assist retainer member is energized to develop the attracting force by the turning on of the power switch 15. However, since the retainer slider 43 is contacted by the lock pin 42 of the retainer lever, the retainer slider 43 cannot slide and, hence, the rotary lever 44, prevented from being connected by the pin to the retainer slider 43, is also prevented from rotating. Then, as the second slider 32 slides to rotate the retainer lever 40, the lock pin 42 descends the slope of the tapered surface of the retainer slider to make the retainer slider 43 move towards the retainer lever by the biasing force of the spring 45. Consequently, the rotary lever 44 is rotated in the clockwise direction. When the lock pin 42 of the retainer lever moves beyond the first retaining portion 43a of the retainer slider, the arm portion 44b of the rotary lever is attracted by the solenoid 46 as shown in FIG. 6B, so that the rotary lever 44 and the retainer slider 43 are stationed fixedly. Therefore, as the first engaging portion 32d of the second slider and the roller pin 25 are disengaged from each other at the end of the earlier half part of rotation of the drive gear member 22, the lock pin 42 of the retainer lever 40 which is tend to be reset in the counterclockwise direction by the biasing force of the spring 41 is made to be engaged and retained by the first retaining portion 43a of the retainer slider. The second slider 32, freed from the driving by the drive gear member 22 and tending to be reset by the biasing force, brings its second engaging portion 32e thereof into engagement with the second engaging surface 40ab of the engaging groove 40a in the retainer lever, to thereby complete the primary retaining of the power assist operation member.

Figure 5C:
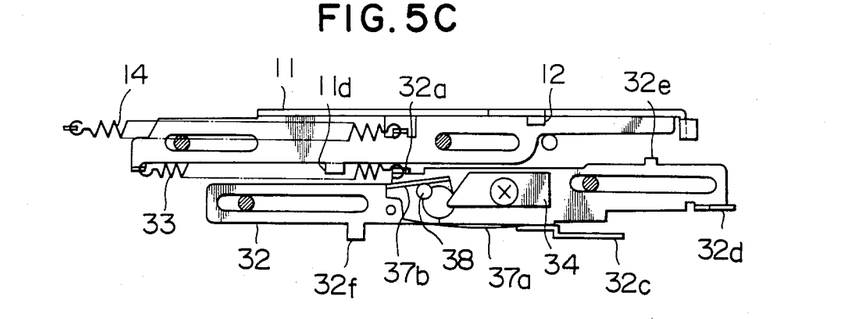
Figure 7C:
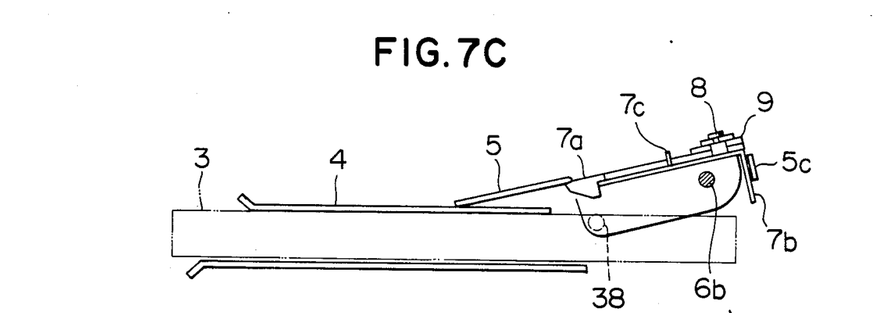

In this state of primary retaining, the second slider 32 has been moved further from the position shown in FIG. 5 so as to further stretch the second reset spring 33 while leaving the first slider 11 at its sliding stroke end. As a result of advancing of the second slider 32, the position control pin 38 of the cassette suspending plate member 5 is moved downward along the tapered surface portion 34b of the cam member 34 on the second slider, by the force of the spring 17 which biases the cassette suspending plate member 5 in the cassette loading direction. Consequently, the suspending plate member 5 is rotated as shown in FIG. 7c. At this time, the end of the cassette suspending plate member presses the cassette housing 4 suspended therefrom, to urge the same downwardly, to thereby bring the cassette 3 into engagement with the tape running mechanism containing the reel dies 54 and 58.

The rotation of the suspending plate member 5 causes also a rotation of the cassette engaging member 7 and the cassette operation lever 9 around the pivots constituted by the shafts 6a, 6b. While the operation lever 9 is prevented from rotating by the pin 12 of the first slider engaging the elongated hole 9b near the center thereof, the upper surface of the suspending plate member 5 disposed above the shafts 6a, 6b and containing the shaft 10 serving as the support shaft for the operation lever 9 is rotated in the cassette ejecting direction. Consequently, the suspending plate member 5 makes a movement relative to the engaging member 7 in the elongated groove 5a of the suspending plate member 5 and the operation lever 9, in such a direction as to bring the rear wall of the suspending plate member 5 into contact with the engaging bent portion 7b of the engaging member 7.

As a result of the mutal contact between the engaging member 7 and the suspending plate member 5 caused by the relative movement mentioned above, a reactional force is produced to prevent the rotation of the suspending plate member 5 so as to hinder the loading of the cassette. To avoid this problem, a clearance portion 5c for permitting the engaging bent portion 7b of the engaging member 7 is formed in the rear wall of the cassette suspending plate member 5.

After the completion of the primary retaining explained hereinbefore, the cassette loading device of this embodiment operates in the following manner. As the drive gear member 22 is further rotated after disengagement of the roller pin 25 thereof from the first engaging portion 32d of the second slider, the roller pin 25 is brought into contact with the bent engaging portion 40c of the retainer lever 40 to thereby rotate the latter. As a result of the rotation of the retainer lever 40, the lock pin 42 of the retainer lever 40 presses the retainer slider 43 overcoming the attracting force of the solenoid 46 and the biasing force of the spring 45, thereby releasing the arm portion 44b of the rotary lever 44 from the magnetic attraction by the solenoid 46, while rolling on the unlocking tapered surface 43c of the retainer slider.

As a result of rotation of the retainer lever 40, the second engaging portion 32e of the second slider 32, engaging with the engaging groove 40a of the retainer lever, is pressed by the second engaging surface 40ab of the engaging groove so that the second slider 32 is further slid forwardly. As will be seen from FIG. 5c, this forward sliding movement of the second slider 32 causes the position control pin 38 on the cassette suspending plate member to engage with the bent portion 37b of the rotary spring member 37 on the second slider 32, so that the position control pin is depressed downwardly by the biasing force of the rotary spring member 37. Consequently, a force for holding the cassette in the loaded state is imparted to the cassette suspending plate member 5.

Figure 4:
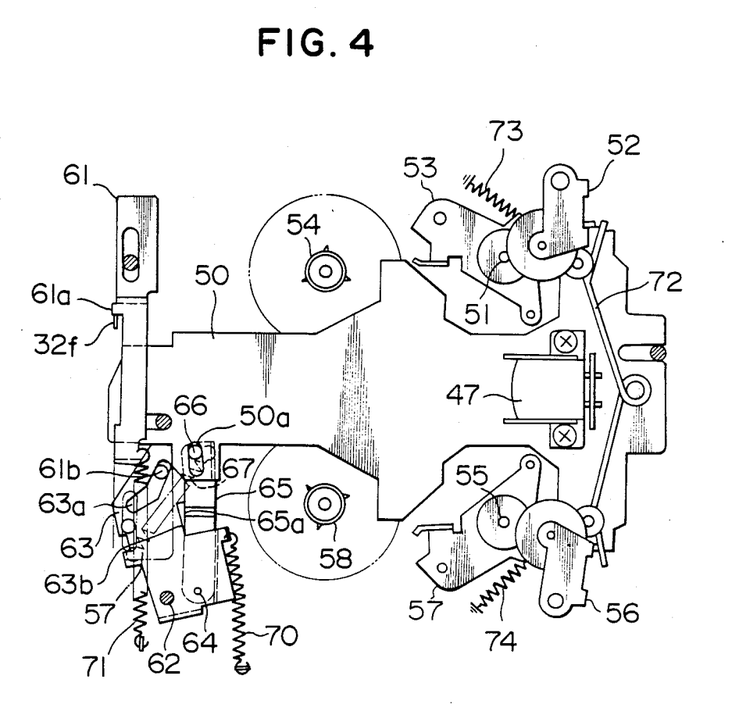
FIG. 4 is a plan view of the head plate advancing mechanism in the playing state.

In response to the forward sliding movement of the second slider 32, the third engaging portion 32f of the second slider 32 is brought into contact engagement with the first engaging portion 61a of the power assist connection slider 61 as shown in FIG. 4, to thereby move the latter slidingly in the forward direction. The forward sliding movement of the connection slider 61 is followed by a rotation of the head plate operating member 63 engaging with the engaging pin 61b of the second engaging portion on the connection slider 61. The head plate operating member 63 then pulls the rotary lever 65 through the tension of the spring 67 so that the head plate 50 is moved ahead to bring the tape in the cassette 3 into contact with the magnetic head 47. The head plate operating member 63 continues to rotate even after the stopping of the forward movement of the head plate 50. As a result, the spring 67 is stretched to dismiss the pressure contact between the retaining portion 63b of the head plate operation member and the retaining portion 65a of the rotary lever, so that the head plate 50 is held at the advanced position by the force of the spring 67.

Figure 6C:
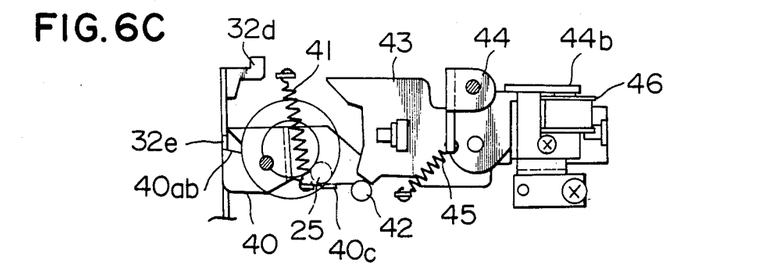

The lock pin 42 of the retainer lever has reached the position for clearing the second retaining portion 43b of the retainer slider by the moment at which the roller pin 25 leaves the bent engaging portion 40c of the retainer lever 40, as a result of further rotation of the drive gear member 22 after the stopping of the forward movement of the head plate, as shown in FIG. 6c. Therefore, the retainer slider 43 again slides toward the retainer lever 40 by the biasing force of the spring 45 connected to the rotary lever 44, so that the arm portion 44b of the rotary lever 44 is attracted again by the solenoid 46 to thereby fix the position of the retainer slider 43. Consequently, when the roller pin 25 is disengaged from the bent engaging portion 40c of the retainer lever at the end of the later half part of the rotation of the drive gear member 22, the lock pin 42 engages with the second retaining portion 43b of the retainer slider to thereby fix the position of the retainer lever 40. The second slider 32, which now receives no driving force, tends to be reset by the resetting biasing force and is stopped again upon contact with the second engaging surface 40ab of the engaging groove 40a of the retainer lever 40, thus completing the secondary retaining of the power assist operation member.

The driving gear member 22, after making one full rotation, is stopped at such a rotational position as to dispose the non-toothed portion 22a in opposition to the small gear 21a of the intermediate gear 21, because the stop pin 22b on the drive gear member 22 is contacted and retained by the stop lever 24 which has been reset to the starting position with its pin 27 having been moved over the protrusion of the stop lever operating portion 32c as a result of the sliding of the second slider 32. The pulling and loading of the cassette, as well as the advancing of the head plate, are thus completed by the power assist operation.

For ejecting the cassette, each part of the described mechanism is sequentially moved in the direction reverse so that in the pulling and loading operation, by the force of the biasing spring associated therewith, when the circuit of the power switch 15 is broken to de-energize the solenoid 46.

As will be understood from the foregoing description, according to the invention, there is provided a power assist cassette loading device having a power assist operation member which is driven in one direction and then locked in each of half rotation of the drive gear so as to sequentially effect the pulling of the cassette, loading of the cassette and the advancing of the head plate. It is, therefore, possible to enjoy the advantage of the power assist by a simple arrangement in which the power assist operation member is driven by a single engaging pin provided on the drive gear member. Accordingly, the present invention permits a reduction in number of parts of the power assist cassette loading device and affords a stable operation of the same because the use of single power assist operation member eliminates any possibility of undesirable change of the operation timing.

Furthermore, since the power assist is performed by driving the power assist operation member in one direction by the drive gear member, it is not necessary to mount the power assist operation member on the drive gear. This permits an effective use of the small space at one side of the cassette as the space for installing the power assist operation member to contribute to the reduction in size of the cassette loading device as a whole.

Furthermore, by constructing the power assist member with two sliders adapted to move in the same direction, a sufficiently long stroke of the operating member is provided to ensure secure operation of the power assist.

It is to be noted also that, since the power assist member and the power assist retaining member are constructed as blocks on respective common mounting plates, the assembling is facilitated and the production cost is correspondingly reduced.

Although the invention has been described through specific terms, the described embodiments are only illustrative but not exclusive, and various changes and modifications may be imparted thereto without departing from the scope of the invention which is limited solely by the appended claims.

What is claimed is:

1. A cassette loading device for automatically pulling and loading a cassette into a tape recorder, comprising a motor-driven drive gear member, a power assist operation member adapted to be driven by said drive gear member so as to sequentially effect pulling of a cassette, loading of said cassette and the advancing of a head plate overcoming respective biasing forces, and a power assist retainer member adapted to retain said power assist operation member, wherein the motor for driving said drive gear member is started by insertion of said cassette into said cassette loading device and, in an earlier half part of rotation of said motor-driven drive gear member, an engaging pin provided on said drive gear member is brought into engagement with a first engaging portion of said power assist operation member to thereby drive the latter and, at the end of the earlier half part of rotation of said drive gear member, one end of said retainer member engages with a second engaging portion of said power assist operation member to thereby make a primary retaining of said power assist operation member, and wherein, in the latter half part of rotation of said motor-driven drive gear member, said engaging pin engages with an engaging portion of said retainer member so as to drive said retainer member which is in engagement with the second engaging portion of said power assist operation member to thereby further drive said power assist operation member to sequentially effect the pulling of said cassette, loading of said cassette and advancing of said head plate, whereby a secondary retaining of said power assist member is made by said retainer member at the end of the latter half part of rotation of said motor-driven drive gear member.

2. A cassette loading device according to claim 1, wherein said power assist retainer member includes: a retainer lever having a bent engaging portion for engagement with the engaging pin of said drive gear member, an engaging groove formed in one end thereof and a rotatable lock pin on the other end thereof, said retainer lever being rotatably supported so as to be in opposition to said motor-driven drive gear member and being biased in the direction opposing the rotation of said motor-driven drive gear member; a retainer slider having a tapered surface formed on the end thereof contacting said lock pin on said retainer lever, a first retaining portion, unlocking tapered surface and a second retaining portion, said retainer slider being slidable towards said lock pin; a rotary lever provided at its one end with an arm portion and supported in such a manner as to cause a sliding motion of said retainer slider through a pin connected to said retainer slider, said rotary lever being spring-biased in such a direction as to press said retainer slider against said lock pin; and a solenoid adapted to attract said arm portion to thereby lock said retainer slider at a position nearest to said lock pin; wherein, as said retainer lever is rotated by the rotation of said drive gear member, said lock pin sequentially rolls on said tapered surface, first retaining portion, unlocking surface and second retaining portion of said slider, so that said arm portion of said rotary lever is attracted by said solenoid at the end of said earlier half part of rotation of said drive gear member and at the end of said later half part of rotation of said drive gear member, respectively, to thereby retain and lock the position of said retainer slider to retain said lock pin by said first retaining portion and said second retaining portion, respectively, to effect the primary retaining and secondary retaining of said power assist operation member.

3. A cassette loading device according to claim 2, wherein said power assist retainer member is mounted on a common mounting plate.

4. A cassette loading device according to claim 1, wherein said drive gear member is disposed such that an axis thereof extends in parallel with a drive shaft of the cassette tape recorder, while said power assist retainer member is disposed in parallel with a plane of rotation of said motor-driven drive gear member so as to oppose to the latter, and wherein said power assist operation member is adapted to slide along a plane which is parallel to the direction of insertion of said cassette and substantially perpendicular to the rotation plane of said motor-driven drive gear member.

5. A cassette loading device according to either one of claims 1 or 4, wherein said power assist operation member includes a first slider and a second slider, said first slider being adapted to be moved following the movement of said cassette, said first slider including a switch operating portion for operating a switch for starting said motor and an engaging portion for causing movement of said second slider and being biased by a first reset spring in the direction of ejection of said cassette, whereas said second slider has, in addition to said first engaging portion and said second engaging portion, a third engaging portion for operating a head plate advancing mechanism, said second slider being connected to said first slider through a second reset spring having a biasing force greater than that of said first reset spring, whereby, as said first slider is operated by the insertion of said cassette, said switch operating portion turns said switch to start said motor and said engaging portion contacting one end of said second slider drives said second slider towards said drive gear member to make said engaging pin of said drive gear member engage with said first engaging portion and further with said retainer member to thereby drive said second slider, so that said second slider further moves said first slider through said second reset spring to thereby effect the pulling and loading of said cassette and, thereafter, said third engaging portion engages with one end of said head plate advancing member to thereby activate said mechanism.

6. A cassette loading device according to claim 5, wherein said first and second sliders are held by a common holding member.

7. A cassette loading device according to claim 6, wherein said power assist retainer member includes: a retainer lever having a bent engaging portion for engagement with the engaging pin of said drive gear member, an engaging groove formed in one end thereof and a rotatable lock pin on the other end thereof, said retainer lever being rotatably supported so as to be in opposition to said motor-driven drive gear member and being biased in the direction opposing the rotation of said motor-driven drive gear member; a retainer slider having a tapered surface formed on the end thereof contacting said lock pin on said retainer lever, a first retaining portion, unlocking tapered surface and a second retaining portion, said retainer slider being slidable towards said lock pin; a rotary lever provided at its one end with an arm portion and supported in such a manner as to cause a sliding motion of said retainer slider through a pin connected to said retainer slider, said rotary lever being spring-biased in such a direction as to press said retainer slider against said lock pin; and a solenoid adapted to attract said arm portion to thereby lock said retainer slider at a position nearest to said lock pin; wherein, as said retainer lever is rotated by the rotation of said drive gear member, said lock pin sequentially rolls on said tapered surface, first retaining portion, unlocking surface and second retaining portion of said slider, so that said arm portion of said rotary lever is attracted by said solenoid at the end of said earlier half part of rotation of said drive gear member and at the end of said later half part of rotation of said drive gear member, respectively, to thereby retain and lock the position of said retainer slider to retain said lock pin by said first retaining portion and said second retaining portion, respectively, to effect the primary retaining and second ary retaining of said power assist operation member.

8. A cassette loading device according to claim 7, wherein said power assist retainer member is mounted on a common mounting plate.

* * * * *